Nov. 11, 1958 — H. H. MORSE — 2,859,611
TESTING MEANS FOR FUEL SYSTEM
Filed Aug. 15, 1955 — 2 Sheets-Sheet 1
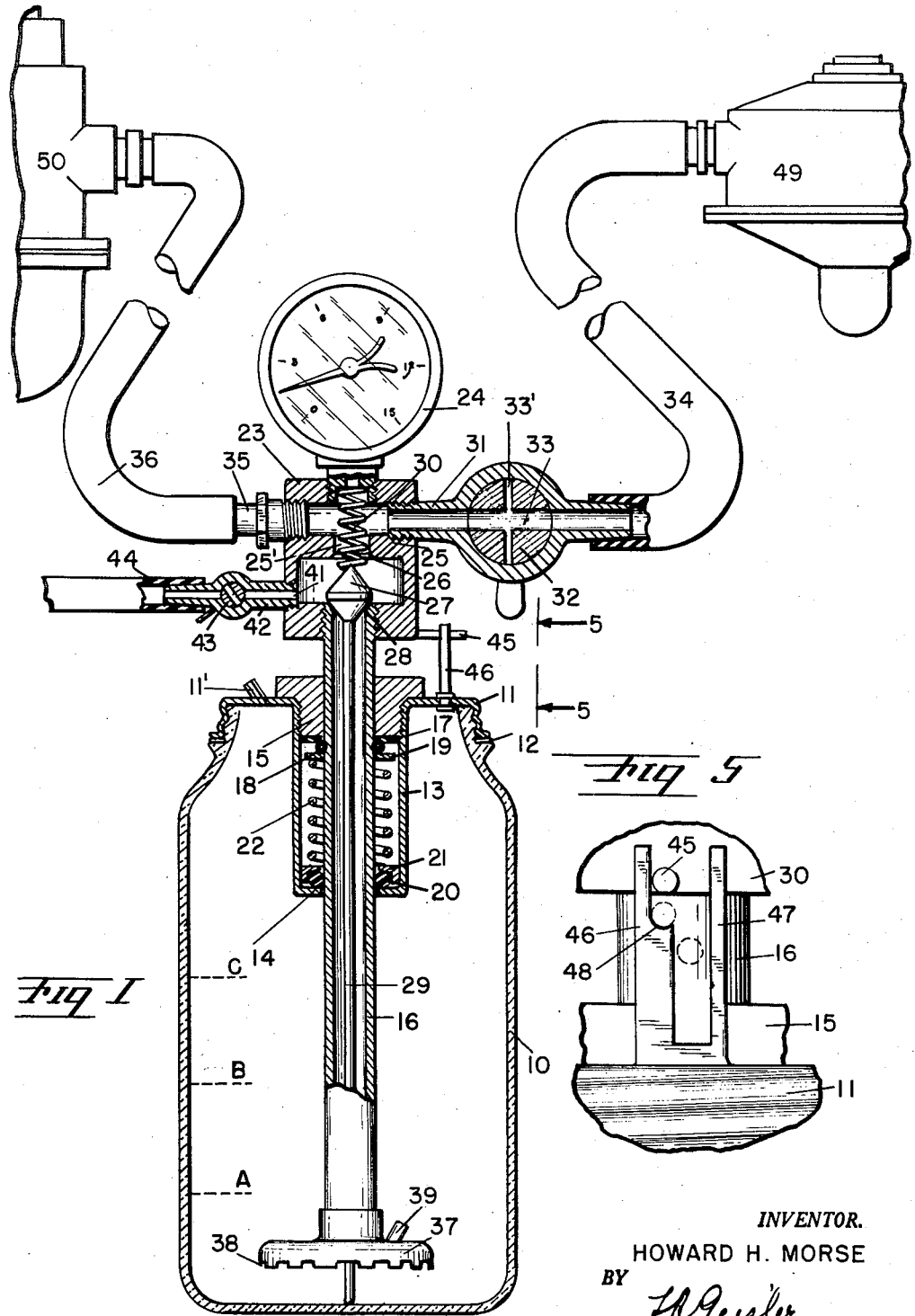
INVENTOR.
HOWARD H. MORSE
BY
ATTORNEY Nov. 11, 1958 H. H. MORSE 2,859,611
TESTING MEANS FOR FUEL SYSTEM
Filed Aug. 15, 1955 2 Sheets-Sheet 2
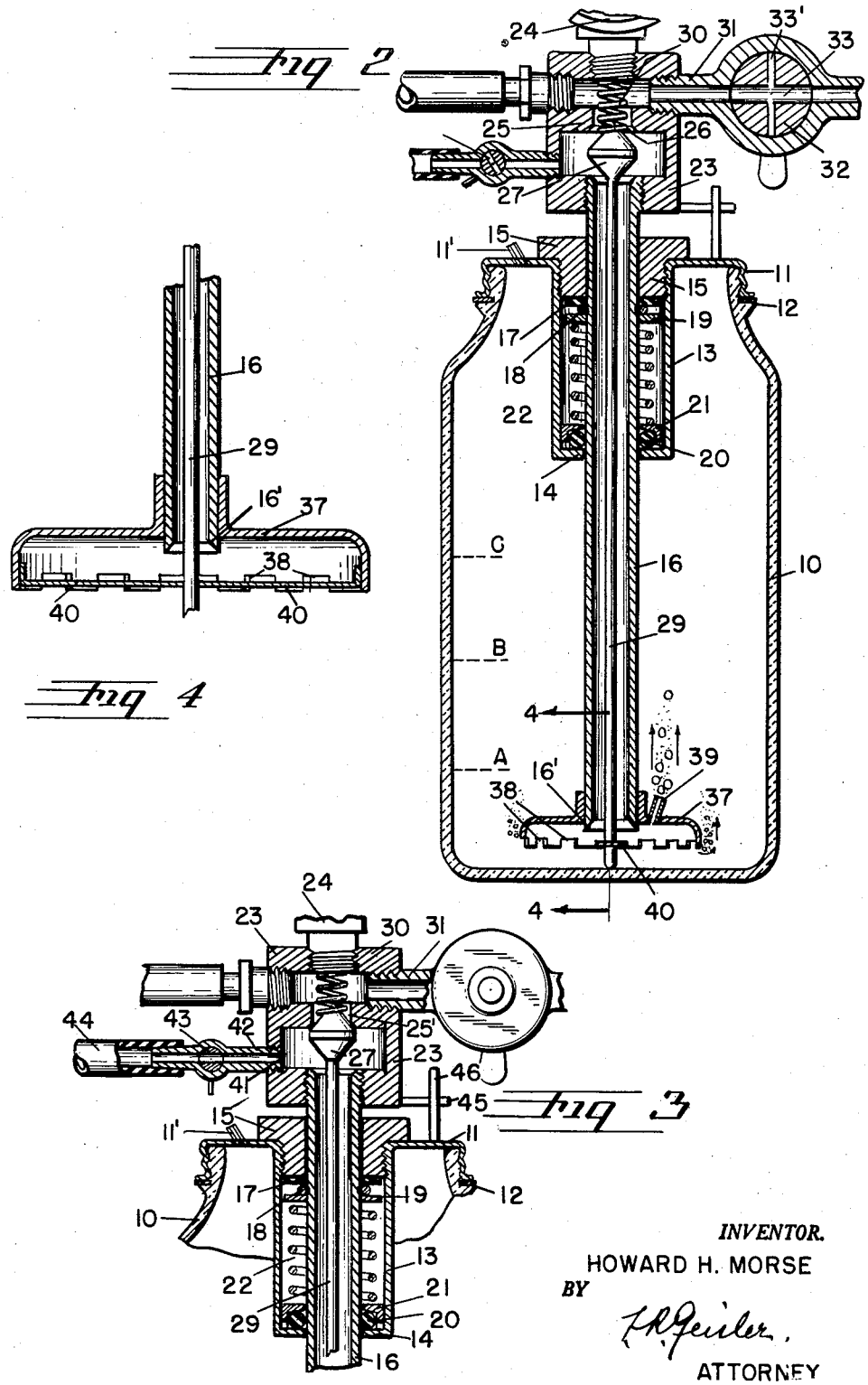
INVENTOR.
HOWARD H. MORSE
BY
ATTORNEY

United States Patent Office 2,859,611
Patented Nov. 11, 1958

2,859,611

TESTING MEANS FOR FUEL SYSTEM

Howard H. Morse, Portland, Oreg.

Application August 15, 1955, Serial No. 528,337

7 Claims. (Cl. 73—118)

The present invention relates to means for testing the fuel delivery system, including the efficiency of the fuel pump, by which the gasoline or liquid motor fuel is supplied to an internal combustion motor, particularly to the motor of an automotive vehicle; and this application is a continuation-in-part of the pending application Serial No. 348,392 filed under date of April 13, 1953, now Patent 2,730,897, and entitled, "Fuel System Tester."

An object of the present invention, in addition to providing a simple and practical means for testing the fuel pump performance and for ascertaining the existence of a leak either at the carburetor or at the fuel pump, is also to provide improved means by which leakage of air into the suction side of the fuel pump, and thus an air leak in the line leading from the fuel tank to the pump, can be easily ascertained.

In the device of the above mentioned application, Serial No. 348,392, the existence of an air leak at the suction side of the fuel pump, and thus in the line between the fuel tank and the fuel pump, is indicated by the presence of air in the fuel delivered into a receptacle having a transparent wall, the air then causing visible bubbles to rise to the surface of the fuel in the container. However, there may be vapor bubbles as well as air bubbles in the delivered fuel, expecially if the test is being made when the temperature is warm, and while an experienced operator can easily distinguish between vapor bubbles and air bubbles in the fuel, since vapor bubbles are so much smaller than air bubbles, a less experienced operator, while making such a fuel system test, might mistake vapor bubbles for air bubbles, or vice versa, and thus report incorrectly on the test.

An important object of the present invention accordingly is to enable air bubbles to be distinguished more clearly from vapor bubbles in such test by providing a test device in which the two types of bubbles will follow different paths, as the fuel is delivered into the receptacle of the testing device.

Another object of the invention is to provide an improved fuel system testing device, having a receptacle for receiving the fuel during the test, provided with a connected valve assembly so arranged as to enable the collected fuel in such receptacle to be conveniently siphoned off and returned to the motor fuel tank at the conclusion of the test.

A further object of the invention is to provide an improved fuel system testing device in which fuel pump performance can be determined quickly under restricted flow as well as free flow conditions.

Other advantages in the improved testing means of the present invention will be readily apparent from the following description and explaination with reference to the accompanying drawings wherein:

Figure 1 is an elevation, partly in section, of the fuel system testing device illustrating the same connected with the fuel pump and with the carburetor of an automotive vehicle and also illustrating the manner in which the device is used for the testing of fuel pump pressure and for ascertaining possible leakage either in the fuel pump or in the carburetor;

Figure 2 is a sectional elevation of the same device illustrating its employment in the making of flow tests and also for testing for air leaks in the fuel line;

Figure 3 is a fragmentary sectional elevation, similar in part to Figure 2, illustrating the manner in which the fuel collected in the receptacle of the device during the testing is returned by siphoning action to the fuel tank of the motor;

Figure 4 is an enlarged sectional view, taken on line 4—4 of Figure 2, of the "air bell" used in the receptacle through the medium of which "air bell" vapor bubbles and air bubbles delivered into the receptacle by the flow of the fuel, will follow clearly distinguishable different courses; and Figure 5 is an enlarged fragmentary elevation taken on line 5—5 of Figure 1.

Referring first to Figure 1, the testing device includes a fuel receptacle 10, which is shown in the drawing as a cylindrical glass jar, although this receptacle may be of different shape and material provided it has a transparent wall so that the delivery of the fuel into the receptacle can be clearly and easily observed. The receptacle 10 has a circular neck which is formed with threads to accommodate the threads of a cap 11 which fits on the top of the receptacle and has sealing engagement with an interposed gasket 12. The cap has an air vent 11'.

The cap 11 is formed with a central downwardly-extending or recessed cylindrical portion 13 which is open at the bottom and terminates in an annular inwardly-extending flange 14. This recessed cylindrical portion 13 is threaded on the inside at the top for engagement with a retainer nut 15.

A tube 16 extends down into the receptacle 10, having a sliding fit in the retainer nut 15 and also sliding within the flange 14. A spring 22 surrounds the tube 16 in the recess 13 of the cap 11. The lower end of this spring 22 engages a washer 21 located at the bottom of the recess 13, and a suitable seal 20, preferably of neoprene, is interposed between the washer 21 and the bottom flange 14. The upper end of the spring 22 engages a steel washer 19 which in turn engages a steel spring ring 18 secured in a groove on the tube 16. A fiber washer 17 is placed between the bottom of the retainer nut 15 and the spring ring 18. The spring 22 is held under compression at all times between the upper washer 19 and the bottom washer 21, and thus the spring 22 normally maintains the tube 16 in the maximum raised position shown in Figure 1 when the device is set up, but permits the tube 16 to be pushed downwardly a limited distance with respect to the cap 11 and receptacle 10 against the force of spring 22.

A housing 23 is secured on the upper end of the tube 16. This housing 23 in turn supports a pressure gauge 24 of standard construction, the gauge being connected by a channel with the interior of the housing 23. The housing 23 is formed with a transversally extending partition 25 which has a central channel 25' connecting the upper and lower portions of the housing 23.

A valve member 27, preferably shaped substantially as shown in Figure 1, is located in the lower portion of the housing 23 and is secured to the top end of a rod 29. The top end of the tube 16 is beveled so as to form a lower valve seat 28 for the valve member 27, and the wall at the bottom of the channel 25' in the housing 23 is similarly beveled to form an upper valve seat for the valve member 27. A spring 30, located in the upper portion of the housing 23 engages the valve member 27 for the purpose of normally holding the valve member 27 down against the lower valve seat 28.

The upper portion of the housing 23 has an inlet port in which the end of a connecting member 31 is secured. A flexible tube 34 is attached to the outer end of this connecting member 31 and is adapted to be attached to the fuel pump 49 when the device is set up. The connecting member 31 also houses a rotary valve 32. The valve 32 is provided with a regular flow passageway 33 and also with a restricted flow passageway 33'. Normally the valve is positioned as shown in Figure 1 so that the flow from the pump 49 during the testing operation will pass through the regular or unrestricted passageway 33.

The upper portion of housing 23 also has a corresponding outlet port in which a nipple connector 35 is secured. A flexible tube 36 it attached to the outer end of the nipple 35 and is adapted to be connected to the motor carburetor 50 when the testing device is set up.

The valve rod 29 for the valve member 27 extends downwardly through the tube 16 and beyond the bottom end of the tube 16 and extends substantially to the bottom of the receptacle or jar 10. The tube 16, however, terminates above the bottom of the receptacle 10 and an air trap or "air bell" is secured on the end of the tube 16. This "air bell" 37 is circular in shape with a bottom rim normally spaced a short distance above the bottom of the container 10 and extending in a plane parallel to the container bottom. The "air bell" 37 carries a cross bar 40 (see Figures 2 and 4), and the cross bar 40 is formed with a center aperture through which the valve rod 29 passes and the cross bar 40 thus serves as a guideway for the lower portion of the rod 29.

Since the bottom rim of the "air bell" 37 is normally spaced a short distance above the bottom of the receptacle 10 while the valve rod 29 extends to the receptacle bottom, it will be apparent from Figure 1 that a downward thrust on the housing 23 and tube 16, by causing the lower valve seat 28 to move downwardly away from the valve member 27, will open the valve-controlled entrance from the lower portion of the housing 23 into the tube 16. Also further downward thrust on the housing 23 and the tube 16, by bringing the upper valve seat 26 into contact with the valve member 27, will close the passageway or central channel 25' leading from the upper portion of housing 23 to the lower portion. In other words, when the tube 16 is in its normal raised position, as illustrated in Figure 1, the valve member 27 will be in its relative lower closed position; when the tube 16 and with it the housing 23 is thrust downward a slight distance, against the force of spring 22 and also the force of spring 30, the valve member will be in its relative open position illustrated in Figure 2; and when the tube 16 and housing 23 are thrust a sufficient distance downwardly the valve member 27 will be in its relative upper closed position illustrated in Figure 3. The purpose for providing for these relative changes of valve position will be presently apparent.

As a guide means for facilitating the bringing of the valve member 27 into either of these relative desired positions, thus for controlling the extent of downward movement to be given to the housing 23 and tube 16 with respect to receptacle 10, and valve rod 29 and valve member 27, the housing 23 carries an extending bar or finger 45 which is positioned in the space between a pair of upright guide bars 46 and 47 which are secured on the cap 11 (see also Figure 5). The guide bar 46 is formed with a central inside shoulder 48. When the device is set up the housing 23 is so arranged that the finger 45 will be positioned against the inner face of the guide bar 46, as shown by the upper full line position of the finger 45 in Figure 5. The shoulder 48 is positioned at the proper relative height so that when the housing 23 and tube 16 are thrust downwardly to the extent that the guide finger 45 comes into engagement with the shoulder 48, the valve member 27 will then be in its relative middle or neutral position with respect to its upper and lower valve seats 26 and 28. Then when it is desired to thrust the housing 23 and tube 16 downward still further in order to have the upper valve seat 26 engaged by valve member 27, the housing 23 is given a slight turn so as to move the guide finger 45 against the other guide bar 47 and thus enable the guide finger 45 to move downward further in the space between the two guide bars, as indicated by the lower broken line position in Figure 5.

The housing 23 is provided with a second outlet port 41 in which an end of a connecting member 42 is secured. A flexible discharging tube or hose 44 is attached to the outer end of member 42, and, when the test device is set up, the free end of the hose 44 is inserted in the filler neck of the fuel tank of the motor. The connecting member 42 houses a shut-off valve 43 which is kept closed at all times except at the termination of the test, as later explained.

The "air bell" 37, on the bottom of the tube 16, has an air vent 39 in the top. The bottom rim of the "air bell" 37, preferably although not necessarily, is formed with a series of identical notches 38 (see also Figure 4).

When the device is set up and connected in the manner described and as illustrated in Figure 1, and thus with the valve 32 in the flow line from the pump 49 having its main passageway open, with the valve 43 closed, and with the valve member 27 engaging the lower valve seat 28 and thus closing the entrance into the tube 16, the motor and fuel pump are operated and the pressure on the gauge 24 noted. The motor and pump are then stopped and the gauge observed. If the gauge pressure drops towards zero this would indicate a leak either at the discharge check valve of the pump 49 or at the needle and seat of the carburetor 50. The location of such leak is determined by again operating the motor and pump to bring the gauge up to the preceding reading, then stopping the motor and pump and pinching or clamping one of the flexible tubes 24 or 36, momentarily preventing any passing of fuel therethrough, and observing the gauge. Thus, for example, if the tube 34 is closed in this manner and the gauge pressure drops, this will indicate a leak in the carburetor 50, whereas if the gauge pressure does not drop under such circumstances this will indicate that the leak is in the pump.

Assuming that there is no leak either in the carburetor or in the pump, the next step in the test would be to test the pump performance. For this purpose the motor and pump are again started and the tube 16, housing 23 and gauge 24 are pressed downwardly with respect to the receptacle 10 until the guide finger 45 comes into engagement with the shoulder 48 (Figure 5). This causes the valve member 27 to be in the relative middle or neutral position illustrated in Figure 2, in which case the fuel delivered by the pump will pass down through the tube 16 and into the receptacle 10.

The transparent wall of the receptacle 10 is provided with suitable volume indicating markings, such as the lines A, B, and C, the lowest line being the starting level for the flow test and the lines B and C arranged to indicate proper volume flow for small and large pumps respectively during the prescribed period of time (for example, during 45 seconds at 500 R. P. M. engine speed). The moment the housing 23, and tube 16 are released and allowed to return to the normal raised position of Figure 1 the flow of the fuel down into the tube 16 and into the receptacle 10 will be shut off.

While this flow test is taking place the operator observes the passing of the fuel into the bottom of the receptacle 10 for the purpose of ascertaining the presence of air in the delivered fuel, such air resulting in air bubbles. The presence of air and the resulting air bubbles would mean that air is being drawn into the pump as the fuel is drawn from the storage tank of the motor, thus indicating a leak in the fuel line between the storage tank and pump.

As previously mentioned, however there may be vapor bubbles as well as air bubbles in the fuel as delivered into the receptacle, and although vapor bubbles will be considerably smaller, it is important that any possibility of mistaking one for the other should be avoided.

As the delivered fuel passes from the bottom end of the tube 16 and into the "air bell" 37 (Figures 2 and 4) any air will immediately rise to the top in the "air bell" and then escape upwardly through the air vent 39. On the other hand, the smaller vapor bubbles will follow the direction of flow of the fuel from the bottom of the tube 16 and pass out from under the bottom rim of the "air bell" 37, passing out through the notches 38 in the event the bottom rim is notched as illustrated in the drawings. Preferably the bottom end of the tube 16 is beveled outwardly as shown at 16' in Figures 2 and 4 to facilitate directing the flow of the fuel into and out from the "air bell." Thus with the employment of the "air bell" the operator engaged in making the test need not exert special care in order to distinguish air bubbles from vapor bubbles on the basis of bubble size, but only need observe whether any bubbles are discharged from the air vent 39. This is an important feature of the invention.

As is well known, leaks on the suction side of the pump and in the fuel line leading from the fuel storage tank to the pump never leak fuel but merely suck in air and in consequence such leaks ordinarily are not readily detected. The fuel line to the pump may develop leaks or cracks as a result of damage from rocks in the highway. Such leaks, if not corrected, cause premature wearing out of pump and enable vapor locks in the fuel system to occur more easily and prevent pumps from supplying adequate volume of fuel at high motor speeds and particularly at high temperatures. Thus the ascertaining of the existence of such an air leak is very necessary for any proper and thorough testing of the fuel system of the motor.

In addition to testing the volume of maximum flow from the pump in the manner previously described it is also desirable to test the flow when the flow is restricted, inasmuch as mechanical fuel pumps with check valves must operate against a pressure in actual use. A defective intake check valve assembly in the fuel pump, for example, would cause the pump performance under restricted flow to be very unsatisfactory even though the pump delivers full volume when there is no restriction. With the present improved device the testing for restricted flow is accomplished easily, and in the same manner as the full flow test already described, merely by rotating the valve 32, in the connecting member 31 in the line from the fuel pump, 90° until the smaller restricting passageway 33' is substituted in place of the unrestricted passageway 33 of the valve. The housing 23 and gauge 24 are held pushed down half way, with the guide finger 45 engaging the shoulder 48 (Figure 5) and with valve member 27 thus in the same relative middle or neutral position illustrated in Figure 2.

When the entire test is completed it is desirable to return the fuel, which has been collected in the receptacle 10, to the fuel storage tank for the motor. With the end of the hose 44 inserted in the filling neck of the fuel storage tank the valve 43 is opened and the housing 23 is allowed momentarily to return to raised position in order to close the entrance into the top of tube 16. A flow of fuel from the pump will then take place through the housing 23, valve 43, and hose 44 to the fuel tank. Then the housing 23 is pushed all the way down in order to bring the valve member 27 into the relative position illustrated in Figure 3 and close the passageway 25'. This normally will cause a siphoning action to be set up (since the receptacle 10 will be at a higher elevation than the fuel storage tank), and this will continue until the receptacle 10 has been emptied, provided the housing 23 is kept constantly pushed down. Should there not be enough flow from the pump to start this siphoning action the siphon can be started by applying a slight amount of air pressure to the air vent 11' in the cap of the receptacle.

Thus, when this device has been set up for testing, and connected with the pump and carburetor as shown in Figure 1, a pump pressure test, a test for leaks at the discharge check valve of the pump and at the needle and seat of the carburetor, a flow test under both unrestricted and restricted conditions, and the ascertaining of the existence of any possible leak in the fuel line between the fuel storage tank and pump, can all be accomplished very simply and easily; and finally the fuel collected during the test can be returned to the storage tank before the device is disconnected, thus further lessening the time and inconvenience involved in the entire testing operation.

I claim:

1. In a fuel system tester of the character described including a fuel-receiving receptacle having a transparent wall and a cap and a tube slidably mounted in the cap extending down into the receptacle and terminating a spaced distance from the receptacle bottom, spring means supporting said tube in normal raised position with respect to said receptacle and cap but permitting said tube to be thrust downwardly a limited distance against the force of said spring means, a housing on said tube above said receptacle, said housing having a chamber, a discharge outlet for said chamber, shut-off means normally closing said outlet, a lower port in said chamber leading into said tube, an upper inlet port in said chamber in vertical alignment with said lower port, a valve member in said chamber, said ports having valve seats for said valve member, said valve member being of such size as to enable said member to close either of said ports or to be in neutral position between them, a valve rod attached to said valve member extending down through said tube and engaging the bottom of said receptacle, spring means urging said valve member and valve rod downwardly, whereby, when said tube and said housing are in normal raised position with respect to said receptacle, said valve will close the lower of said ports and the partial lowering of said tube and housing with respect to said receptacle will bring said valve into relative neutral position between said ports while further lowering will cause said valve to close said upper inlet port, and whereby, upon the closing of said upper inlet port by said valve and the opening of said shut-off means, said receptacle will be connected with said discharge outlet, means for connecting the motor fuel pump with said housing above said upper inlet port, and means for connecting the motor carburetor with said housing above said upper inlet port.

2. In a fuel system tester including a fuel-receiving receptacle having a transparent wall and a cap and a tube slidably mounted in the cap extending down into the receptacle and terminating a spaced distance from the receptacle bottom, spring means supporting said tube in normal raised position with respect to said receptacle and cap but permitting said tube to be thrust downwardly a limited distance against the force of said spring means, a housing on said tube above said receptacle, said housing having a chamber, a discharge outlet for said chamber, shut-off means normally closing said outlet, a lower port in said chamber leading into said tube, an upper inlet port in said chamber in vertical alignment with said lower port, a valve member in said chamber, said ports having valve seats for said valve member, said valve member being of such size as to enable said member to close either of said ports or to be in neutral position between them, a valve rod attached to said valve member extending down through said tube and engaging the bottom of said receptacle, spring means urging said valve member and valve rod downwardly, whereby, when said tube and said housing are in normal raised position with respect to said receptacle, said valve will close the lower of said ports and the partial lowering of said tube and housing with respect to said receptacle will bring said valve into relative neutral position between said ports while further lowering will cause said valve to close said upper inlet port, and whereby, with the closing of said upper inlet port by said valve and the opening of said shut-off means in said discharge outlet said receptacle will be connected with said discharge outlet, means for connecting the motor fuel pump with said housing above said upper inlet port, similar means for connecting the motor carburetor with said housing above said upper inlet port, and a gauge connected with said housing above said upper inlet port.

3. In a fuel system tester including a fuel-receiving receptacle having a transparent wall and a cap and a tube slidably mounted in the cap extending down into the receptacle and terminating a spaced distance from the receptacle bottom, spring means supporting said tube in normal raised position with respect to said receptacle and cap but permitting said tube to be thrust downwardly a limited distance against the force of said spring means, a housing on said tube above said receptacle, said housing having a chamber, a discharge outlet for said chamber, shut-off means normally closing said outlet, a lower port in said chamber leading into said tube, an upper inlet port in said chamber in vertical alignment with said lower port, a valve member in said chamber, said ports having valve seats for said valve member, said valve member being of such size as to enable said member to close either of said ports or to be in neutral position between them, a valve rod attached to said valve member extending down through said tube and engaging the bottom of said receptacle, spring means urging said valve member and valve rod downwardly, whereby, when said tube and said housing are in normal raised position with respect to said receptacle, said valve will close the lower of said ports and the partial lowering of said tube and housing with respect to said receptacle will bring said valve into relative neutral position between said ports while further lowering will cause said valve to close said upper inlet port, and whereby, with the closing of said upper inlet port by said valve and the opening of said shut-off means in said discharge outlet said receptacle will be connected with said discharge outlet means for connecting the motor fuel pump with said housing above said upper inlet port, means for connecting the motor carburetor with said housing above said upper inlet port, a gauge connected with said housing, an air-collecting shield on the lower end of said tube, said shield having a bottom rim substantially parallel to the bottom of said receptacle, and an air vent in the top of said shield.

4. The combination set forth in claim 3 with said shield being round and concentric with said tube, and with said bottom rim notched.

5. The combination set forth in claim 2 with the addition of guide elements for the positioning of said tube and housing, and therewith the relative positioning of said valve member, when said tube and housing are lowered with respect to said receptacle.

6. In a fuel system tester of the character described including a fuel-receiving receptacle having a transparent wall and a cap and a tube slidably mounted in the cap extending down into the receptacle and terminating a spaced distance from the receptacle bottom, spring means supporting said tube in normal position with respect to said receptacle and cap but permitting said tube to be thrust downwardly a limited distance against the force of said spring means, a housing on said tube above said receptacle, said housing having a chamber, a lower port in said chamber leading into said tube, an upper port in said chamber in vertical alignment with said lower port, a valve member in said chamber, said ports having valve seats for said valve member, said valve member being of such size as to enable said member to close either of said ports or to be in neutral position between them, a valve rod attached to said valve member extending down through said tube and engaging the bottom of said receptacle, spring means urging said valve member and valve rod downwardly, whereby, when said tube and said housing are in normal raised position with respect to said receptacle, said valve will close the lower of said ports and the partial lowering of said tube and housing with respect to said receptacle will bring said valve into relative neutral position between said ports while further lowering will cause said valve to close said upper port, means for connecting the motor fuel pump with said housing above said upper port, means for connecting the motor carburetor with said housing above said upper port, a gauge connected with said housing above said upper port, an air-collecting shield on the lower end of said tube, said shield having a bottom rim spaced from and substantially parallel to the bottom of said receptacle, a further outlet port for said chamber, a shut-off valve for said further port, and a hose leading from said shut-off valve and port to the storage tank for said fuel system.

7. The combination set forth in claim 6 with the addition of a rotary restricting valve in said connecting means for said pump, and guide elements for the positioning of said tube and housing, and therewith the relative positioning of said valve member, when said tube and housing are lowered with respect to said receptacle.

References Cited in the file of this patent

UNITED STATES PATENTS

| | | |
|---|---|---|
| 2,062,173 | Haskins | Nov. 24, 1936 |
| 2,566,742 | Odell | Sept. 4, 1951 |
| 2,730,897 | Morse | Jan. 17, 1956 |